United States Patent
Heilborn

[11] Patent Number: 5,826,537
[45] Date of Patent: Oct. 27, 1998

[54] COLLAPSIBLE PET BED

[76] Inventor: Eric W. Heilborn, 2216 I St., Bellingham, Wash. 98225

[21] Appl. No.: 777,582

[22] Filed: Dec. 31, 1996

Related U.S. Application Data

[63] Continuation of Ser. No. 491,786, Jun. 19, 1995, Pat. No. 5,588,393.

[51] Int. Cl.$^6$ .................................................. A01K 1/035
[52] U.S. Cl. .............................................. 119/28.5; 5/722
[58] Field of Search ............................... 119/28.5; 5/722, 5/657, 16

[56] References Cited

U.S. PATENT DOCUMENTS

| | | | |
|---|---|---|---|
| 3,879,775 | 4/1975 | Iwata | 5/639 |
| 4,654,907 | 4/1987 | Haugaard | 5/420 |
| 4,999,863 | 3/1991 | Kane | 5/98.1 |
| 5,000,116 | 3/1991 | Fife et al. | 119/28.5 |
| 5,033,408 | 7/1991 | Langenbahn | 119/28.5 |
| 5,136,981 | 8/1992 | Barreto, III et al. | 119/28.5 |
| 5,161,484 | 11/1992 | Duane | 119/28.5 |

Primary Examiner—Michael J. Carone
Assistant Examiner—Yvonne R. Abbott
Attorney, Agent, or Firm—Todd N. Hathaway

[57] ABSTRACT

A pet bed which is collapsible as a unit for more efficient packaging, storage, and display. The foam cores which form the bottom cushion and the surrounding wall are enclosed in first and second fabric enclosures. The enclosure for the bottom cushion is joined to the fabric layer which extends over the inside and top of the wall core, but is free from attachment to the fabric which extends under the lower edge of the wall. This permits the bottom cushion to be tilted up to a vertical alignment parallel to the forward and rearward portions of the wall as the latter are pressed together, producing a flattened structure in which the forward and rearward wall portions lie flat against the upper and lower surfaces of the bottom cushion. The lower edges of the two fabric enclosures are provided with elasticized openings which retain the foam cores, but permit their removal for washing of the fabric cover.

4 Claims, 5 Drawing Sheets

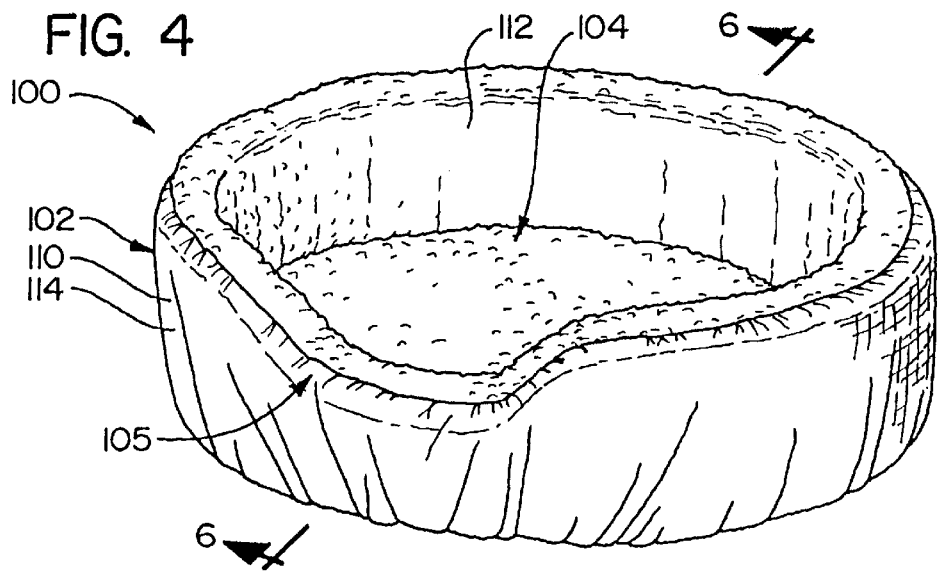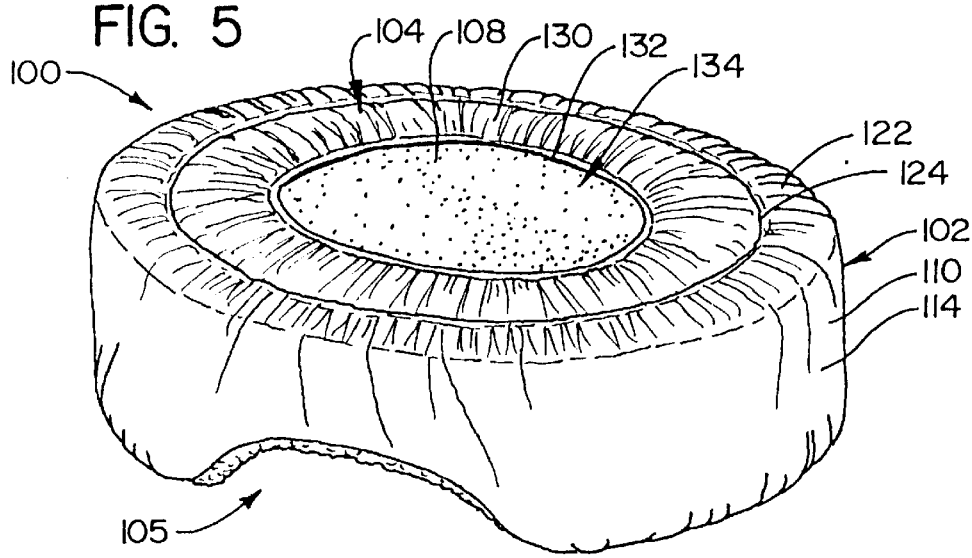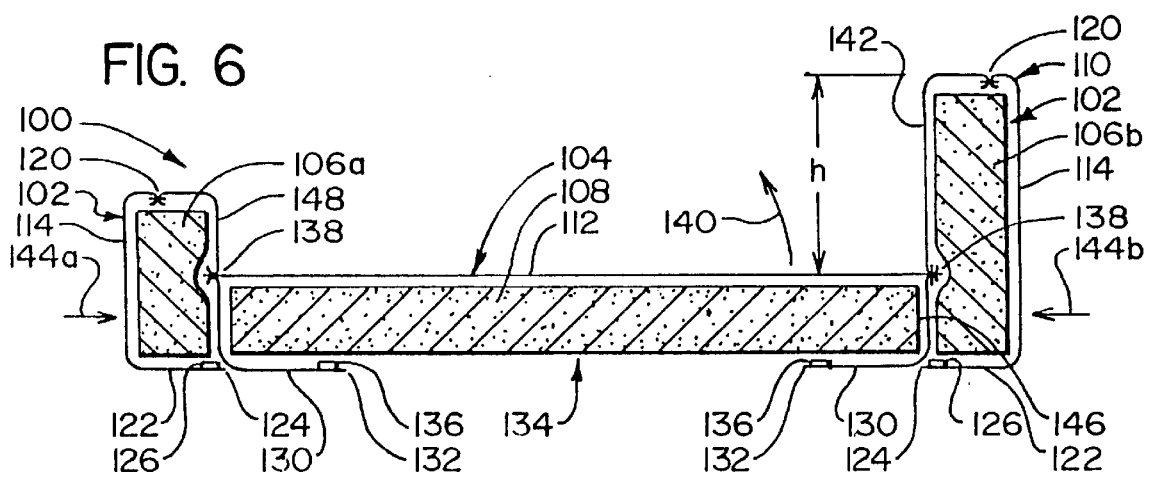

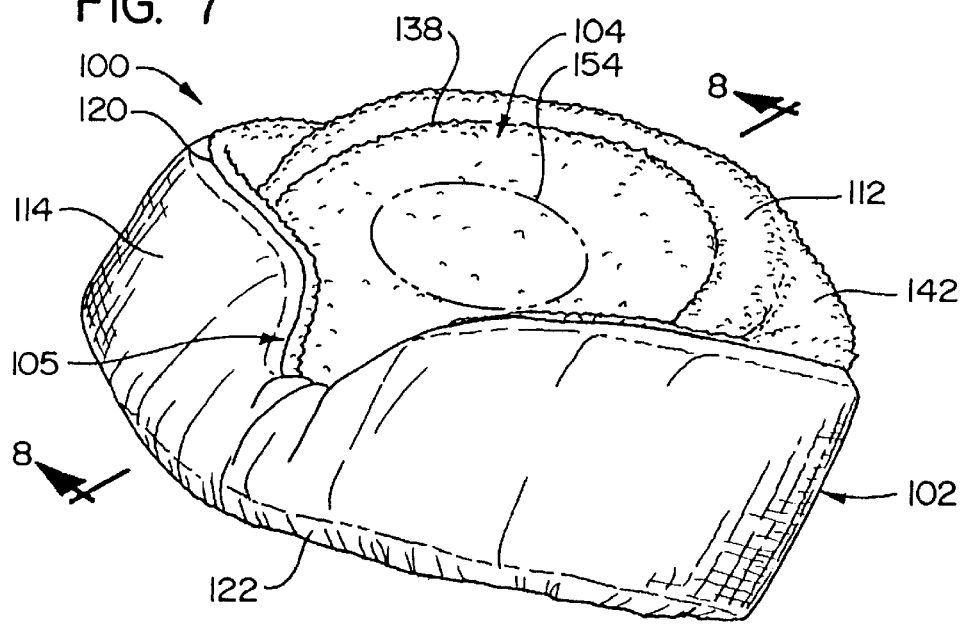
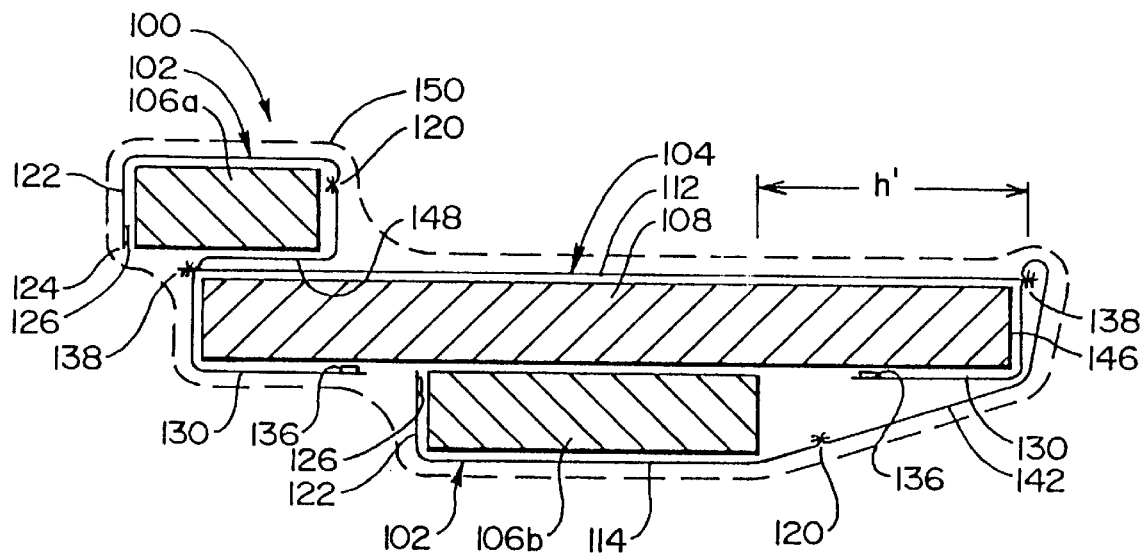

5,826,537

COLLAPSIBLE PET BED

This is a continuation of application Ser. No. 08/491,786 filed on Jun. 19, 1995 now U.S. Pat. No. 5,588,393.

FIELD OF THE INVENTION

The present invention relates generally to pet beds, and more particularly to a pet bed for cats, dogs, and other animals which collapses to provide a compact unit for storage, shipment, and sales display.

BACKGROUND OF THE INVENTION

A common form of pet bed comprises an upstanding oval or circular wall which surrounds a padded floor cushion. Typically, the wall and floor cushion are formed of foam rubber or a similar material, over which a covering of fabric and/or artificial lamb's wool is installed. Such pet beds are attractive from the point of view that they provide the animal with a sheltered, semi-enclosed bed in which the pet feels secure, and also because the semi-enclosed structure helps to contain hair, etc. to provide a neat and tidy installation for in-home.

A typical pet bed 10 of this general type is shown in FIGS. 1–3 and is disclosed in U.S. Pat. No. 5,136,981. As noted above, the bed has an upstanding oval wall portion 12 which is formed by a foam slab or core 14, and in order to provide more convenient access for the animal, a cutaway portion 16 is formed in the forward side of the wall. The floor cushion 20, in turn, is formed by a flat, oval foam core 22 which abuts the inner surface of the perimeter wall 12 so as to maintain the oval shape of the latter.

As can be seen in FIGS. 1–3, the foam core portions are covered and held together by a fabric cover 24, with a synthetic sheep skin lining 26 on the interior portions of the bed. As can be seen in FIG. 3, the coverings consist of essentially two sheets of fabric. The first, namely the lining 26, extends over the top of the bed and is stitched to the exterior fabric 28 (e.g., cotton flannel or nylon fabric) at a perimeter seam 30 which runs along the entire upper edge of the oval sidewall 12. The fabric forming the exterior covering, in turn, extends down the outside of the wall portion and part way across the bottom of the bed. At the lower edge of the perimeter wall, there is another seam 32 at which the outer fabric layer is attached to the inner layer, the latter being tucked down between the outer edge of the floor panel 20 and the perimeter wall in this area. This forms a pocket or "bag" for holding the foam core 22 of the floor cushion. In the bed which is illustrated in U.S. Pat. No. 5,136,981, an opening 24 with an elastic enclosure band 26 is provided in the bottom fabric panel to permit removal of the bottom cushion core.

The prior art design which is shown in FIGS. 1–3 provides a comfortable and economical pet bed, but exhibits several significant deficiencies in practical use. A first problem is that because the foam core 14 is fully enclosed by the fabric covering which is stitched at seams 30 and 32, it is impossible for the customer to remove the wall core for washing of the fabric cover. Perhaps even more seriously, traditional pet beds of this general type are exceedingly inefficient in terms of the space which is required for storage, shipping, and point of sales display. For example, as can be seen in FIG. 9, when conventional pet beds having this shape are stacked for shipment, they take up an excessive volume of space, which greatly adds to packaging and transportation costs. Moreover, in a retail environment, such beds take up excessive shelf space, and are almost impossible to arrange in a neat, well-organized display.

The bed which is disclosed in U.S. Pat. No. 5,136,981 has provided a partial solution to this problem, being that the foam core for the bottom cushion is removable so that the perimeter wall can be flattened for packaging. This solution is not entirely satisfactory, however, because it requires packaging of two separate parts (i.e., the perimeter wall with its fabric covering and the separate bottom cushion), which is both inefficient and unsightly in practice, and which also requires assembly by the customer following purchase.

Accordingly, a need has existed for a ped bed of the semi-enclosed type which collapses so as to afford more efficient storage, shipping, and display of the product, and which does so as a single piece and does not require subsequent assembly by the purchaser. Moreover, there has existed a need for such a bed which permits convenient removal of all of the foam core structures from the fabric cover for laundering of the latter.

SUMMARY OF THE INVENTION

The present invention has solved the problems cited above, and is a pet bed which is collapsible as a unit for packaging. Broadly, the bed comprises: (a) a generally planar cushion member, (b) a resiliently collapsible wall member which at least partially surrounds the cushion member when the bed is in its expanded configuration, and (c) a fabric cover member which comprises a first enclosure for the cushion member and a second enclosure for the wall member, the second enclosure being attached to the first enclosure at a junction along an edge thereof, at least a part of the junction being displaceable in a vertical direction relative to the wall member so as to permit the cushion member in the first enclosure to be tilted up as the first and second sides of the wall member are pushed together, to a collapsed position in which the cushion member is substantially parallel to and sandwiched between the first and second sides of the wall member.

The second enclosure for enclosing the wall member may comprise an inner fabric layer which extends upwardly and over an inner surface and upper edge of the wall member, and an outer fabric layer which extends downwardly over the outer surface and under the lower edge of the wall member, the junction attaching the first enclosure to the second enclosure being formed between an edge of the first enclosure and inner fabric layer of the second enclosure, and being free from attachment to the edge of the outer fabric layer which extends under the wall member, so that the inner fabric layer at the junction is free to fold upwardly as the cushion portion is tilted upwardly to the collapsed position.

Preferably, the inner fabric layer of the second enclosure has sufficient height from the junction to the upper edge of the wall member to permit the inner fabric layer to fold and extend upwardly as the cushion member is tilted up, until the rearward portion of the wall member comes into flat abutment against the lower surface of the cushion member. Also, the wall member may comprise a notch portion which is formed in an upper edge of the portion thereof which is generally opposite the junction between the enclosures, so as to permit the wall member to fold downwardly and rearwardly at the notch portion and into abutment with an upper surface of the cushion member as the cushion member is tilted to the collapsed position; also the notch is preferably of sufficient width to form an access opening in the wall member when the bed is in its expanded configuration.

The junction between the first and second enclosures may be a seam connecting an upper edge of the first enclosure to the inner fabric layer of the second enclosure.

The second enclosure may further comprise means for inwardly biasing the edge of the outer fabric layer which extends under the wall member, so that the inwardly biased edge retains the wall member in the second enclosure yet permits its selected removal therefrom for cleaning of the fabric cover. The means for inwardly biasing the edge of the fabric layer may comprise an elastic band attached to the edge of the fabric layer so as to draw the edge inwardly towards a central area of the bed. Similarly, the first enclosure may comprise a top fabric layer which extends over an upper surface of the cushion member and an outer fabric layer which extends downwardly over and under an outer edge of the cushion member, with means being provided for inwardly biasing the downwardly and inwardly extending edge of the latter so as to retain the cushion member in the first enclosure yet permit its selective removal for washing of the cover.

BRIEF DESCRIPTION OF THE DRAWINGS

FIG. 4 is a top perspective view of a pet bed in accordance with the present invention, this being of the semi-enclosed type, somewhat similar in overall shape to the prior art pet bed shown in FIGS. 1–3 but being collapsible as a unit for packaging and shipment;

FIG. 5 is a bottom perspective view of the pet bed of FIG. 4, showing the first and second elasticized closures which permit removal of both of the foam core portions for laundering of the fabric cover;

FIG. 6 is a cross-sectional view, similar to FIG. 3, showing the foam core structures of the pet bed in accordance with the present invention, and also the relationship of the seams which join the fabric cover panels so as to permit the pet bed to be collapsed as a single unit for storage, shipment, point of sale display, without requiring removal of any part thereof or reassembly by the customer;

FIG. 7 is an upper perspective view of the pet bed of FIGS. 4–6, showing the pet bed in its collapsed, flattened configuration;

FIG. 8 is a cross-sectional view of the pet bed of FIG. 7 in the collapsed configuration;

DETAILED DESCRIPTION

Figure 1:
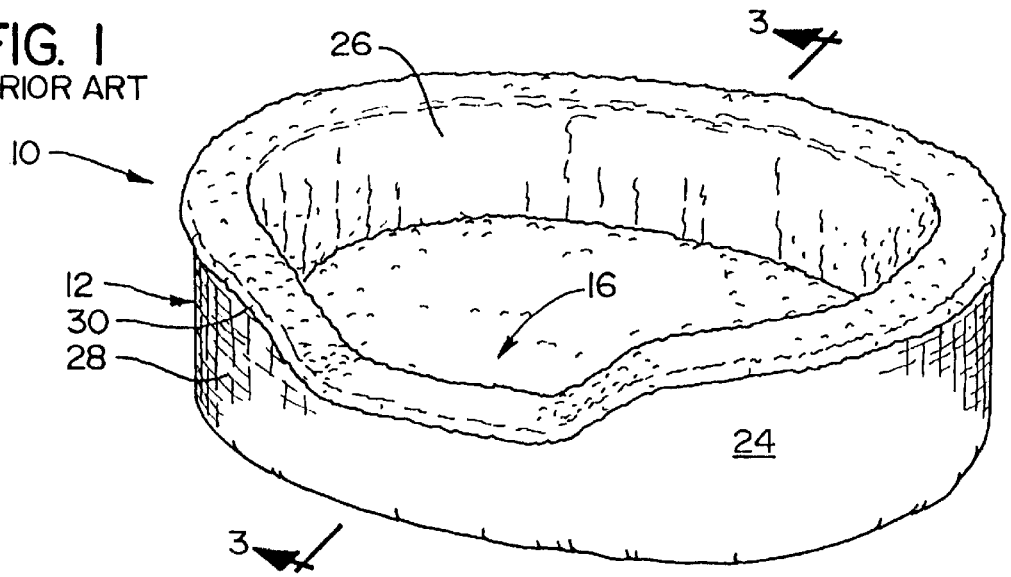
FIG. 1 is a top perspective view of a prior art bed of the semi-enclosed type which is unable to collapse as a unit for packaging and storage, and which does not allow removal of the wall core for washing of the fabric cover.
Figure 2:
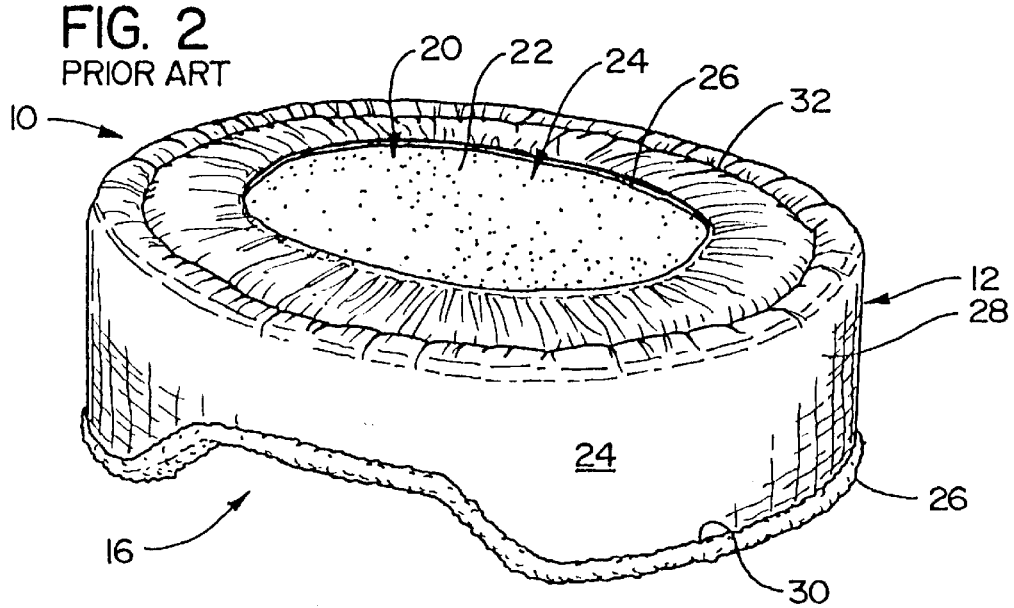
FIG. 2 is a bottom perspective view of the prior art pet bed of FIG. 1, showing its structure and the manner in which the removable foam bottom cushion is retained in its fabric pocket by an elasticized closure.

FIGS. 4–6 show an example of a pet bed 100 in accordance with the present invention, in its fully erected configuration, as when the bed is in its normal configuration for use by the pet. As was noted above, the bed 100 is of the semi-enclosed type, this example being a generally oval in overall shape. Accordingly, there is a generally vertically extending wall portion 102 which is encircles a horizontal bottom cushion portion 104.

As can be seen in FIG. 6, the main structural part of the wall portion 102 is an upstanding foam core 106, while that of the bottom cushion portion is a horizontal foam core 108. Similar to the prior art bed which was described above, the exterior of the foam core elements is covered by a fabric cover 110, in which the inner surfaces of the bed are covered with a synthetic lamb's wool 112 or similar material which is comforting to the animal, and the outer and lower surfaces of the bed are covered with a relatively hard-wearing, smooth-surfaced fabric 114; it will be understood, however, that any suitable fabrics may be used to form the covering.

Figure 3:
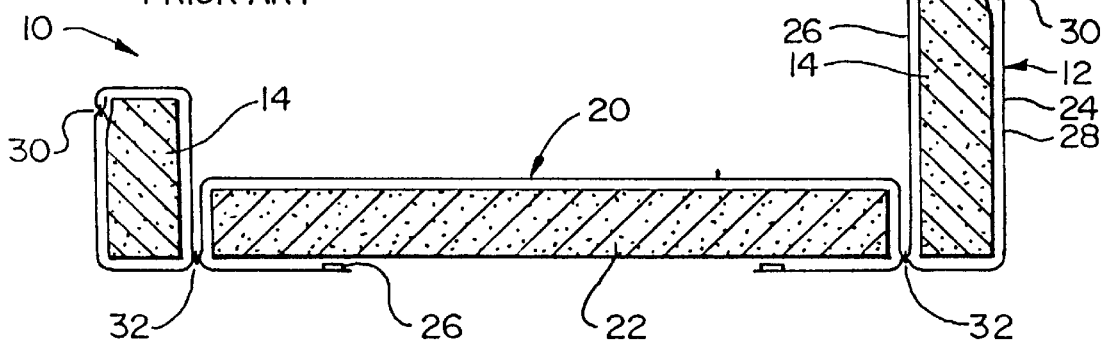
FIG. 3 is a cross-sectional view of the pet bed of FIGS. 1–2, showing the foam cores thereof and the relationship of the seams by which the upper and lower layers of the fabric cover are joined.

As was noted above, it is a particular feature of the present invention that the pet bed can be compressed or folded flat for storage, shipping, and display without having to remove any part thereof. The construction which permits this to be done can be seen in FIG. 6, which is to be contrasted with the corresponding prior art construction which is shown in FIG. 3.

In particular, FIG. 6 shows that the inner/upper fabric panel 112 is joined to the outer fabric panel 114 at a perimeter seam 120 which runs along the top of the wall portion 102 of the bed, and that the outer fabric panel 114 extends downwardly over the outside of the wall. Unlike the prior art construction which is shown in FIG. 3, the outer fabric panel 114 is not joined again into the inner fabric layer at the base of the wall. Instead, the lower portion 122 of the outer fabric extends under the lower edge of the sidewall foam core and terminates at an edge 124 which is positioned proximate the lower inner edge thereof, the fabric edge 124 being biased radially inwardly by a continuous elastic band 126 (see also FIG. 5).

A second annular fabric panel extends inwardly around the edge of the bottom cushion core 108, and has an inner edge 132 which defines a generally oval opening 134, the fabric edge 132 being biased radially inwardly by a second elastic band 136. The outer edge of the annular fabric panel 130, in turn, extends upwardly between core 108 and the inner surface of the wall portion core 106, and is attached to the upper fabric layer 104 at a seam 138 which extends around the bottom cushion core at the upper edge thereof.

Thus, the first annular fabric panel 114, in combination with the interior panel 112, forms an elastic pocket for enclosing the foam core of the wall portion of the bed, and similarly, the second annular fabric panel 130 serves in combination with the inner panel 112 to provide an elastic pocket for the bottom cushion core. This construction, i.e., the first and second elasticized openings at the bottom of the bed 100, enables the customer to easily remove both foam cores for cleaning of the fabric cover, as contrasted with the single opening structure of the prior art bed which is shown in FIG. 3.

Moreover, because the lower, inside edge of the fabric panel 114 that covers the wall core is not attached to the annular fabric panel 130 which encloses the bottom cushion core, the latter can be pivoted upwardly in the direction indicated by the arrow 140. As this is done, the back wall portion 142 of the upper fabric layer, which extends upwardly from seam 138 along the back edge of the bottom cushion, folds in an upward direction. As this is done, the forward and rearward wall portions 106a, 106b are pressed towards one another, in the directions indicated by arrows 144a, 144b. As this motion continues, the forward and rearward wall portions come together, and the height "h" of the rear wall portion 142 of the upper fabric layer is sufficient to permit the rearward edge of the bottom cushion to rotate upwardly past the upper edge of the rear wall portion 106b, until the bottom cushion is finally pressed flat between and lies more or less parallel to the front and rear wall portions 106a, 106b. In other words, as is shown in FIG. 8, the height "h" of the rear wall fabric portion 142, plus the distance from the inner edge of the wall to the seam 120, is selected to be sufficient to allow the rearward edge 146 of the bottom cushion to pivot upwardly past the upper edge of the rear wall portion 106b, by the distance "h'" which is necessary for the inner surface of the rear wall portion to come into flat abutment with the lower surface of the bottom cushion.

Simultaneously, the sides of the entrance notch 105 at the front of the bed collapse together as shown in FIG. 7, permitting the front wall portion 106a to move downwardly and rearwardly into flat abutment against the upper surface of the bottom cushion 104, as is also shown in FIG. 8.

In short, the combination of the loose fabric rear panel 142 and the downwardly folding front wall 106a permit vertical adjustment of the foam core members until they come to the position shown in FIG. 8, in which the bottom cushion is sandwiched flat between the front and rear portions of the perimeter wall. It will be noted, however, that the movement of the front wall portion 106a relative to the forward edge of the bottom cushion may also be achieved in part or in whole by forming the forward wall portion 148 of the upper fabric panel with sufficient height to accommodate the shift in positions. Furthermore, the arrangement may be reversed in some embodiments, i.e., the floor which may pivot upwardly at the front wall portion and downwardly at the rear wall. It will also be understood that, in some embodiments, the wall covering and liner fabrics may be cut from a single sheet of fabric rather than from two different materials as in the illustrated example.

Once the bed has been folded or "flattened" to the compact configuration which is shown in FIG. 8, it can be secured in this position by shrink wrap and/or banding 150, or by other suitable means.

Figure 9:
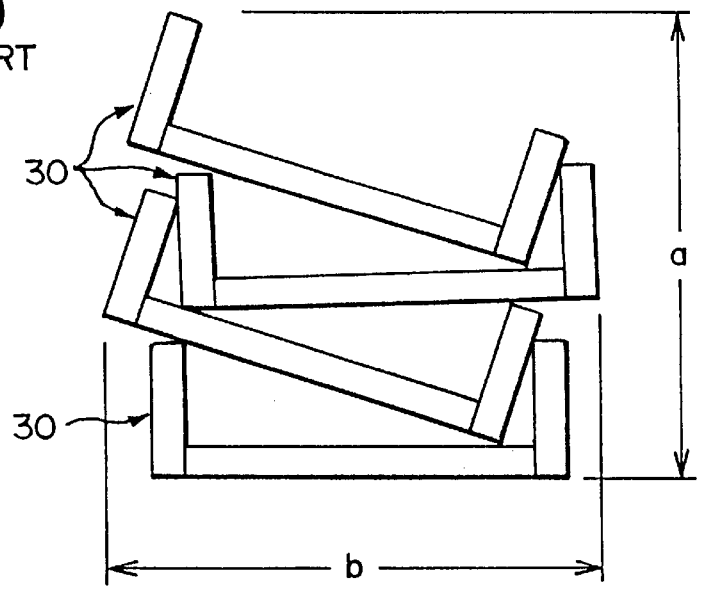
FIG. 9 is a cross-sectional view of several prior art pet beds of the semi-enclosed type, illustrating how the non-collapsible structures thereof render it impossible to arrange these in an efficient manner for storage, shipment, or point of sales display.
Figure 10:
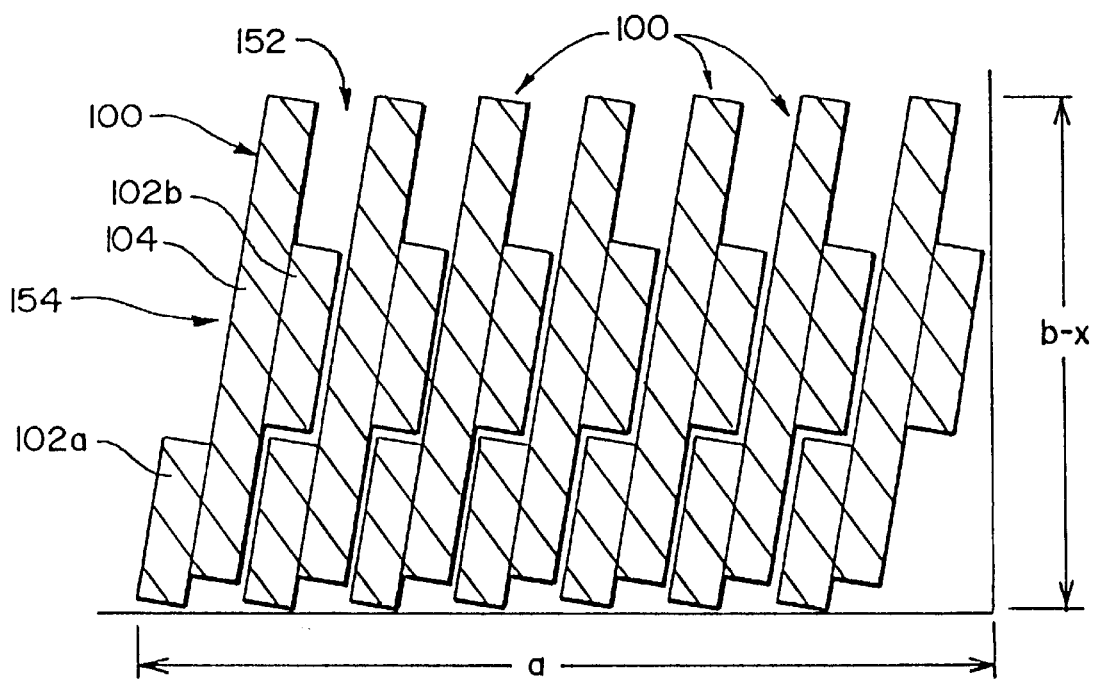
FIG. 10 is a cross-sectional view somewhat similar to FIG. 9, showing the manner in which the configuration of the beds of the present invention in their collapsed, flattened condition facilitates an efficient, orderly arrangement for storage, shipment display, and so forth.

The much more efficient packaging which is thus made possible can be seen by comparison of FIGS. 9 and 10. As was noted above, FIG. 9 shows the stacking of a typical non-collapsible prior art pet bed 30. In the particular example which is shown in FIG. 9, it is only possible to package four of the non-collapsible beds 30 in a space defined by the dimensions "a" X "b" (the dimension along the third axis is assumed to be identical in both FIGS. 9 and 10). However, using collapsible beds 100 in accordance with the present invention, having essentially identical dimensions, it is possible to pack approximately seven units in an actually slightly smaller space as defined by dimensions "a" X "b-x". As can be seen, the downwardly folded forward wall portion 102a of each of the collapsed beds 100 fits beneath the rearward wall portion 102b of the bed in front of it, and against the bottom side of the bottom cushion 104, so that each collapsed basically bed occupies the thickness of two of its foam core portions. Also, if two or more stacks of the collapsed beds are packed adjacent one another, the downwardly extending edges of the forward wall portions 102a may be received in the gaps 152 between the edges of the bottom cushions.

In the example given above, an approximately 75% improvement in volumetric efficiency of the packaging is achieved by the present invention, which represents a very significant savings in terms of both packaging and shipping costs. It will be understood that these are only rough approximations, however, and that various factors, such as thicknesses of the foam cores and the overall shapes and sizes of the erected beds will naturally effect how many of the beds can be packed in a particular volume.

As was also noted above, another advantage of the pet bed of the present invention is that it provides for a neat and efficient use of shelf space at the point of sale. In particular, as can be seen in FIG. 10, the forward faces of the upturned bottom cushions 104 provides display areas 154 (see also FIG. 7) on which a label and other information can be conveniently positioned for viewing by the customer.

To erect the bed for use by the pet, the customer simply removes the shrink wrap and/or cardboard banding and reverses the steps which were described above with reference to the FIGS. 6–8, simply letting the forward and rear wall portions 102a, 102b spread apart and simultaneously pivoting the bottom cushion portion 104 downwardly to its horizontal position; because the bed collapses as a single unit, it is unnecessary for the customer to perform any additional assembly steps when setting it up, such as inserting foam core panels, for example.

Figure 11:
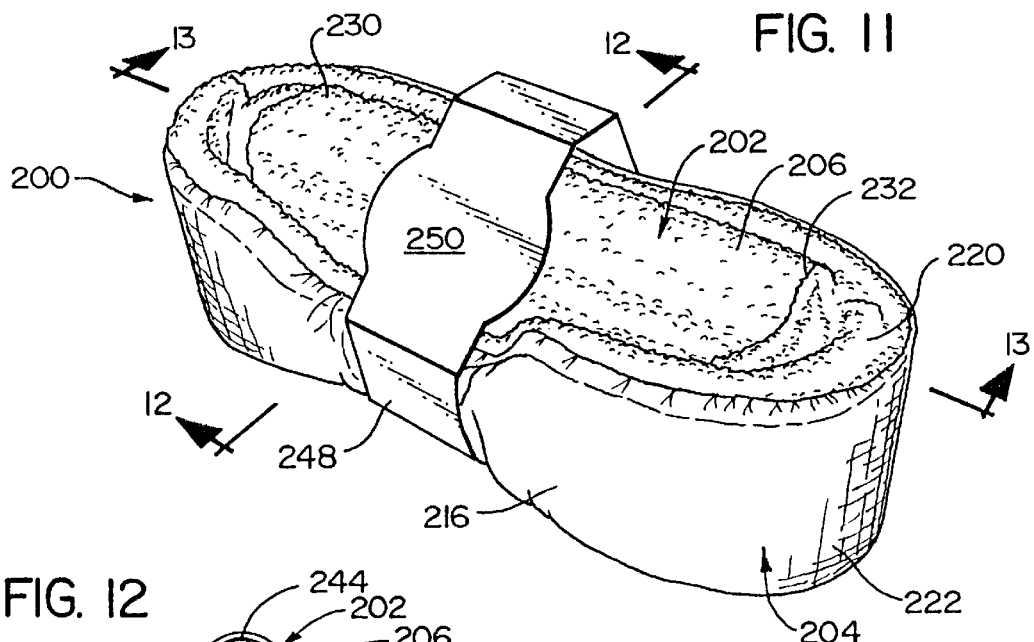
FIG. 11 is a top perspective view of a collapsible pet bed in accordance with a second embodiment of the present invention, in which the bottom cushion folds in half as the bed is collapsed and the edges of the bottom cushion at the ends of the fold shift upwardly relative to the wall member as this is done, FIG. 11 showing the bed in its collapsed configuration.
Figure 12:
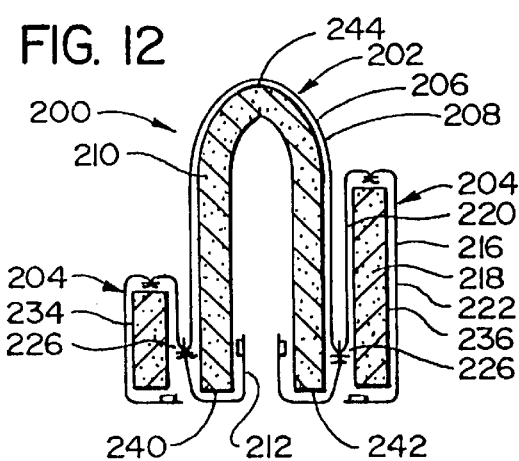
FIG. 12 is a cross-sectional view of the collapsed pet bed of FIG. 11, taken along the short axis thereof, i.e., line 12—12 of FIG. 11.
Figure 13:
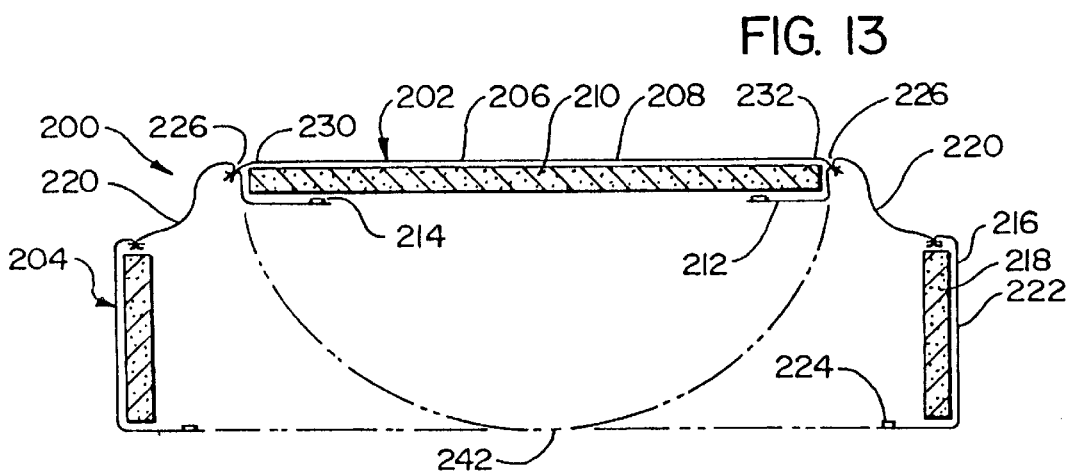
FIG. 13 is a cross-sectional view of the collapsed pet bed of FIG. 11, taken along the long axis thereof, i.e., line 13—13 in FIG. 11.

FIGS. 11–13 show a pet bed 200 in accordance with a second embodiment of the present invention, this being particularly suited to relatively larger sizes of beds. As can be seen, the overall construction of the bed 200 is similar to that which has been described above, in that there is an oval bottom cushion member 202 which is encircled by an upstanding wall member 204. Also, there is a first fabric enclosure 206 for the bottom cushion, this having an upper fabric layer 208 which extends across the top of the foam core 210 and a lower fabric layer 212 which extends under the outer edges thereof, the latter being provided with an elastic band 214 along its edge to form the resiliently deformable opening which allows selective removal of the foam core. Similarly, there is a second fabric enclosure 216 for the foam core 218 of the wall member; as with the embodiment which was described above, this comprises an inner fabric layer which extends upwardly over the inside surface and upper edge of the wall, and an outer fabric layer 222 which extends downwardly over the outer surface of the wall and under the lower edge thereof, the lower edge of the outer fabric panel being provided with an elastic band 224 which forms the pocket for holding the foam core 218.

As is also similar to the embodiment which was described above, the inner fabric layer 220 of the outer enclosure extends downwardly and has its lower edge joined to the edge of the first enclosure 206 at a seam 226 which extends about the perimeter thereof, while the inner enclosure 206 remains free from attachment to the edge of the enclosure 216 which extends under the wall member. This allows the edges of the inner enclosure 206 and bottom cushion core 210 to be displaced upwardly relative to the wall member as the bed is folded, as is shown in FIG. 13.

Thus, as the bed 200 is folded to the collapsed configuration which is shown in FIGS. 11–13, the two edges 230, 232 at the ends of the long axis of the oval bottom cushion 202 bend upwardly as the forward and rearward portions 234, 236 of the wall member are pressed towards one another, and the inner fabric layer 220 in these areas folds and extends upwardly above the upper edge of the wall core to accommodate this movement. Simultaneously, the edges 240, 242 at the ends of the short axis of the bottom cushion remain positioned proximate the lower edges of the wall member 204, or in some embodiments move downwardly relative thereto. This results in the bottom cushion member 202 being folded essentially in half, in an inverted "U" configuration, with an upstanding ridge 244 formed along the long axis thereof. The wall member 204, in turn, is collapsed to a flattened, lozenge shape, with its forward and rearward portions 234, 236 being pressed flatly against the upper surface of the folded bottom cushion 202, adjacent the forward and rearward edges 240, 242 thereof.

The bed 200 can be secured in its collapsed configuration by a cardboard band 248 or other member which is wrapped around the short axis of the collapsed structure. An angled display area 250 may be formed on a forward portion of the band to display the label and other information. Thus, in their compact, collapsed form, the relatively larger beds 200 can be efficiently arranged in a row on a store shelf, with the display area 250 angled upwardly for convenient viewing by the purchaser.

To erect the bed, the purchaser simply removes the retainer band 248 and any associated packing, and spreads the forward and rearward wall portions 234, 236 apart. As this is done, the bottom cushion member 202 unfolds to its oval, planar configuration to form the floor of the bed, the fabric portions 220 at the ends thereof folding and extending downwardly to accommodate this motion relative to the wall member.

In the preferred embodiments which have been illustrated herein, the bottom cushion and wall cores are formed of a resiliently collapsible material, such as foam rubber. It will be understood, however, that in the embodiment which is illustrated in FIGS. 4–8, in which the floor cushion is not required to bend in order for the bed to collapse, the bottom cushion core may be formed in part or in whole of a rigid or semi-rigid material, and with cushioning being provided on the upper surface of this for the animal. Also, in many embodiments, the bottom cushion core may be retained in its enclosure by one, two, or more strips of plastic or webbing material which extend across the bottom opening, or by a continuous bottom panel which is releasably secured to the edges of the enclosure by a zipper, Vector™ (hook and loop) material, snaps, or other means. Furthermore, the foam core itself may be detachable mounted to the upper layer of the enclosure by hook and loop material, snaps, and so forth, so as to permit the lower portion of the fabric enclosure to be dispensed with. Also, the bed of the present invention can be made to collapse as a unit without any means being provided for removal/detachment of the foam cores (i.e., the cores could be permanently mounted within their enclosures), although the advantage of being able remove the cores for washing of the fabric cover would then be lost. Still further, although the fabric covers have, for the purposes of this description, been discussed in terms of inner/outer and upper/lower layers of fabric, it will be understood that this includes a construction in which one or more of these layers may be formed of a single sheet of fabric, such as a single sheet running over the top of the bottom cushion and the upper edge and outer surface of the wall member, or over the outer and inner surfaces of the wall member and under the edge of the bottom cushion member, for example.

It is therefore to be recognized that these and many other modifications may be made to the illustrative embodiments described above without departing from the spirit and scope of the present invention. Accordingly, the invention is not to be limited, except as by the appended claims.

What is claimed is:

1. A pet bed which is collapsible as a unit for packaging, said bed comprising:
    a resiliently flexible cushion portion which is generally flat when in an expanded configuration and which has lengthwise and crosswise axes; and
    an upright, resiliently flexible wall portion mounted to said cushion portion so as to at least partially surround an edge of said cushion portion when said cushion portion is in said expanded configuration;
    said edge of said cushion portion being substantially free from fixed attachment to a lower edge of said wall portion at first and second ends of said lengthwise axis, so that as first and second sides of said wall portion are pushed together along said crosswise axis of said cushion portion, said cushion portion moves upwardly relative to said wall portion at said ends of said lengthwise axis so as to permit said cushion portion to fold along said lengthwise axis to a collapsed configuration in which two halves of said cushion portion are substantially parallel to and sandwiched between said first and second sides of said wall portion for compact packaging.

2. The pet bed of claim 1, further comprising:
    a retaining member removably mounted around said bed and over said first and second sides of said wall portion so as to package said bed with said cushion portion in said collapsed configuration.

3. A method for collapsing a pet bed as a unit for packaging, said method comprising the steps of:
    forming a pet bed having:
        a resiliently flexible cushion portion which is generally flat when in an expanded configuration and which has lengthwise and crosswise axes; and
        an upright resiliently flexible wall portion mounted to said cushion portion so as to at least partially surround and edge of said cushion portion when said cushion portion is in said expanded configuration;
        said edge of said cushion portion being substantially free from fixed attachment to a lower edge of said wall portion at first and second ends of said lengthwise axis; and
    pushing first and second sides of said wall portion together along said crosswise axis of said cushion portion, so that said cushion portion moves upwardly relative to said wall portion at said ends of said lengthwise axis and said cushion folds along said lengthwise axis to a collapsed configuration in which two halves of said cushion portion are substantially parallel to and sandwiched between said first and second sides of said wall portion for compact packaging.

4. The method of claim 3, further comprising the step of:
    removably mounting a retaining member around said bed and over said first and second sides of said wall portion so as to package said bed with said cushion portion in said collapsed configuration.

* * * * *